(12) United States Patent
Eckert et al.

(10) Patent No.: US 6,399,822 B1
(45) Date of Patent: Jun. 4, 2002

(54) METHOD AND DEVICE FOR THE PRODUCTION OF PHOSGENE FROM DIPHOSGENE AND/OR TRIPHOSGENE

(75) Inventors: Heiner Eckert, Munich; Bernhard Gruber, Moosburg; Norbert Dirsch, Emsing, all of (DE)

(73) Assignee: Dr. Eckert GmbH, Munich (DE)

( * ) Notice: Subject to any disclaimer, the term of this patent is extended or adjusted under 35 U.S.C. 154(b) by 0 days.

(21) Appl. No.: 09/524,912

(22) Filed: Mar. 14, 2000

Related U.S. Application Data

(63) Continuation of application No. PCT/EP98/05693, filed on Sep. 8, 1998.

(30) Foreign Application Priority Data

Sep. 15, 1997 (DE) .......................................... 197 40 577

(51) Int. Cl.$^7$ ............................ C07C 51/58; B01J 15/00
(52) U.S. Cl. ...................................................... 562/847
(58) Field of Search ................................ 562/847, 857; 422/164, 198, 209, 232, 239, 305

(56) References Cited

U.S. PATENT DOCUMENTS 6,090,351 A * 7/2000 Euzen et al.

OTHER PUBLICATIONS

Cotarca L., Delogu P., Nardelli A. Sunjic, V., Bis(trichlorormethyl) Carbonate in Organic Synthesis, Synthesis 1996, 557.*

Pasquato L., Modena G., Cotarca L., Delogu P., Mantovani, S. Conversion of Bis(trichloromethyl) Carbonate to Phosgene and Reactivity of Triphosgene, Diphosgene and Phosgene with Methanal.May 30, 2000, J Org. Chem. 65(24) 8224–8228.*

Cotarca el al; "synthesis" 1996, Seiten 553–576, XP002090854.*

Eckert et al; Angew. Chem. Int. Ed. Engl. 26 (1987) No. 9, p. 894.*

Cotarca, L., et al. "Bis (trichloromethyl) Carbonate in Organic Synthesis," *Synthesis*, 1996, Seiten 553–576, XP002090854.

Eckert, H. and Forster, B., "Triphosgene, a Crystalline Phosgene Substitute," *Angew. Chem.* V. 99, No. 9, pp. 922–923, (1987); *Angew. Chem. Int. Ed. Engl.* V. 26, No. 9, 894–895, (1987).

Bracher, F. and Litz, T., "Bis (trichlormethyl) carbonat (Triphosgen)$^{1)}$," *J. prakt. Chem.*, V. 337, pp. 516–518, (1995).

Norwick, J.S., et al., "Synthesis of Peptide Isocyanates and Isothiocyanates," *J. Org. Chem.*, V. 61, pp. 3929–3934, (1996).

* cited by examiner

Primary Examiner—Gary Geist
Assistant Examiner—Farhad Forohar
(74) Attorney, Agent, or Firm—Nath & Associates PLLC; Gary M. Nath; Jerald L. Meyer

(57) ABSTRACT

The invention concerns a method for preparing phosgene from diphosgene and/or triphosgene, by reaction on a catalyst comprising one or several compounds with one or several nitrogen atoms with a pair of deactivated electrons. The invention further concerns a device for preparing phosgene from diphosgene and/or triphosgene, for implementing said method.

28 Claims, 2 Drawing Sheets

Figure 1:
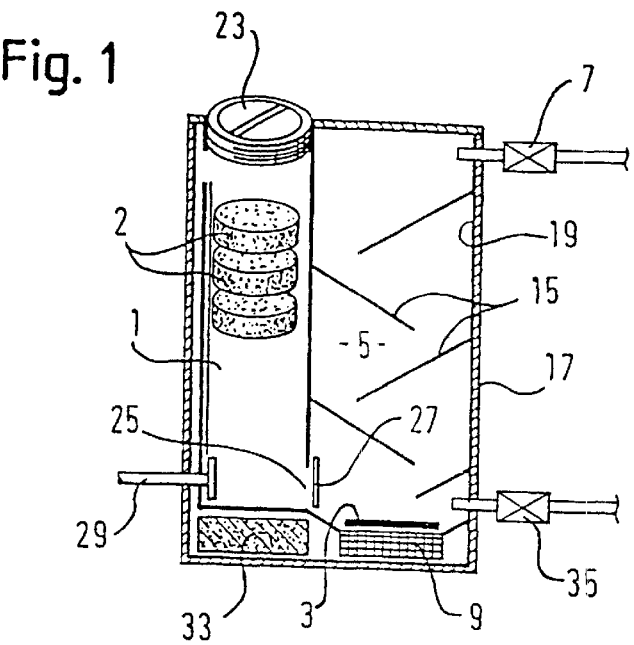

METHOD AND DEVICE FOR THE PRODUCTION OF PHOSGENE FROM DIPHOSGENE AND/OR TRIPHOSGENE

This application is a continuation application of International Application PCT/EP98/05693 filed Sep. 8, 1998 the entire contents of which are hereby incorporated in their entirety.

Phosgene is used in industrial scale as an important starting compound for the production of diisocyanates and polycarbonates among others. A need for phosgene substitutes has arisen as a result of its high toxicity on the one hand and the highly restrictive legislative safety regulations brought about by this with regard to transport, storage and use on the other hand. This need is covered by diphosgene (trichloromethyl chloroformate) that is liquid at standard conditions and crystalline triphosgene (bis(trichloromethyl) carbonate) [H. Eckert, B. Forster, Angew. Chem., 99 (1987) 922–23; Angew. Chem. Int. Ed. Engl., 26 (1987) 894–95; F. Bracher, T. Litz, J. Prakt. Chem., 337 (1995) 516–18; L. Cotarca, P. Delogu, A. Nardelli, V. Sunjic, Synthesis, (1996) 553–76].

In practice, it has been determined that, as was previously the case, it is advantageous to use gaseous phosgene in chemical production processes. Reasons for this are, for one, that known methods can be run with existing plants and, for another, the fact that work is frequently done with an excess of phosgene that has to be removed after the reaction. However, the separation of excess phosgene mentioned in the latter case often turns out to be difficult with less volatile phosgene substitutes, whereas gaseous phosgene can be easily removed [J. S. Nowick et al., J. Org. Chem., 61 (1996) 3929]. However, as a result of the above mentioned legislative safety regulations, phosgene itself is no longer commercially available. Hence, a need exists for a harmless method of production of pure phosgene, immediately before its use in the reaction, from stable precursors such as the substitutes diphosgene and especially triphosgene via their regulated and controllable reaction to phosgene.

Such a reaction of diphosgene and triphosgene on reaction catalysts is already known, but serious disadvantages exist with the known reaction catalysts: thus, triphosgene is stochiometrically reacted on metal salts with strong Lewis acid characteristics, such as aluminum chloride or iron chloride, to phosgene, carbon dioxide and carbon tetrachloride according to the following equation [L. Cotarca, Synthesis, (1996) 556]:

$Cl_3C-O-CO-O-CCl_3 \rightarrow COCl_2+CO_2+CCl_4$.

In this case, the yield of phosgene is only a third of the theoretically possible value therewith. Moreover, the resulting side-products can be disturbing in the subsequent reactions of phosgene and the conversion reaction runs uncontrollably to a great extent. On the other hand, triphosgene is completely stable against weaker Lewis acids such as titanocene dichloride and zirconocene dichloride.

Triphosgene can also be reacted to phosgene on activated charcoal. Although the reaction here is nearly quantitative, the reaction is uncontrollable and can even take on an explosive-like character.

Diphosgene and triphosgene can also be reacted to phosgene on Lewis bases such as pyridine, but in this case, the extremely fast conversion reaction is also not controllable.

In light of this background with the above mentioned disadvantages of the known methods for reacting diphosgene and triphosgene to phosgene, the problem of the present invention is to provide a method for the controllable and substantially quantitative production of phosgene from diphosgene and/or triphosgene.

It was surprisingly found that this problem can be solved by reacting diphosgene and/or triphosgene to phosgene on a catalyst comprising one or more compounds with one or more nitrogen atoms with deactivated free electron pair. Triphosgene can be used in the form mentioned above (bis(trichloromethyl)carbonate) as well as in the cyclic form given in the following formula:

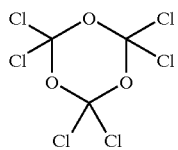

In a preferred embodiment, the deactivation of the free electron pair of the nitrogen atom occurs by mesomerism and/or one or more electron-attracting and/or space-filling groups in the vicinity to the nitrogen atom. The term "in the vicinity" means particularly "in the $\alpha$-, $\beta$-, or $\gamma$-position" to the nitrogen atom with deactivated free electron pair, particularly preferred is "in the $\alpha$-position".

Preferred examples of compounds with nitrogen atom with deactivated free electron pair are compounds with deactivated imine and/or deactivated amine function.

In a preferred embodiment, they are immobilized by binding to polymers such as polyacrylic acid or polystyrene. The immobilized compounds with deactivated imine and/or amine function are optionally bound to the polymer chain over spacer molecules (so-called "spacer". Examples for such spacers are alkoxy groups such as triethylene glycol, tetraethylene glycol and polyethylene glycol groups.

Compounds with deactivated imine function are, for example, higher aromatic or heteroaromatic systems as well as compounds with alkyl groups in the vicinity to the nitrogen atom. Preferred compounds with deactivated imine function that can be used in the method according to the invention are poly-(2-vinylpyridine), phenanthridine as well as phthalocyanine ($H_2Pc$) and metal phthalocyanines (MePc) whose skeletal structure is depicted below:

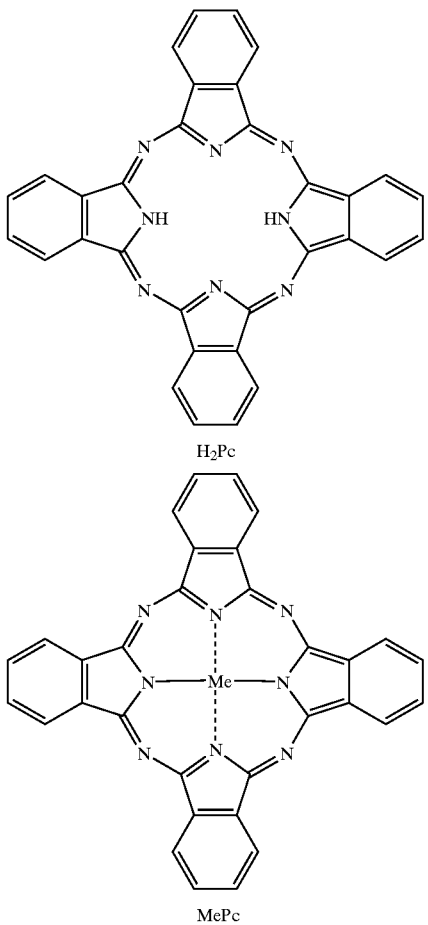

H₂Pc

MePc

The auxiliary group metals of the 4th to 6th period as well as the metals of the $3^{rd}$ to $6^{th}$ period of the main groups 2 to 5 are preferred as metal atoms of the metal phthalocyanine, and particularly, the auxiliary group metals of the $4^{th}$ period (Sc, Ti, V, Cr, Mn, Fe, Co, Ni, Cu, Zn).

The metal atoms of the metal phthalocyanine, especially in the case of the auxiliary group metals, can be complexed with one or more additional ligands such as chloro or oxo. The phthalocyanine and/or the metal phthalocyanines can be used in any crystal modifications. Examples for such crystal modifications of metal phthalocyanines are α-CuPc and β-CuPc.

The above-mentioned preferred compounds with deactivated imine function can optionally be substituted on the carbon skeleton. The substituents include alkyl, cycloalkyl, aryl, halogen, nitro, amino, cyano, carboxy, carbalkoxy, carboxamido as well as heterocyclic groups.

In a preferred embodiment, the phthalocyanine or the metal phthalocyanines can be substituted once or severalfold independently of each other on the benzo groups, wherein the substituents are preferably selected from the above mentioned substituents as well as further phthalocyanines and condensed cyclic or heterocyclic compounds that are themselves optionally substituted.

The compounds with deactivated amine function are preferably selected from deactivated tertiary amine compounds. The deactivation occurs, in a preferred manner, by immobilization by binding the amine compound to polymers, wherein tertiary alkylamines are particularly preferred, and the alkyl groups are the same or different and are selected from methyl, ethyl, propyl and higher linear or branched alkyl groups. An example for a catalyst with deactivated tertiary amine function according to the invention is N,N-dimethylaminomethyl polystyrene.

The catalyst for reacting diphosgene and/or triphosgene is preferably used at a concentration from 0.01 to 10 mol %, particularly preferred is from 0.1 to 2 mol %, with respect to the amount of diphosgene and/or triphosgene. If the catalyst is a catalyst immobilized to a polymer by binding of a compound with nitrogen atom with deactivated free electron pair, then the concentration is calculated based on the amount of substance (in mol) of the compounds with deactivated free electron pair bound to the polymer chain.

In a preferred embodiment of the method, this is carried out with diphosgene and/or triphosgene in the liquid state. The reaction temperature is preferably 80 to 150° C., more preferably 90 to 130° C. and most preferably 100 to 125° C.

Although the method according to the invention can be carried out without solvent, it is also possible to use an inert solvent in the reaction of diphosgene and/or triphosgene.

The present invention also provides a device for the production of phosgene from diphosgene and/or triphosgene as reaction material that comprises a storage vessel for diphosgene and/or triphosgene and a reaction chamber, with phosgene outlet, connected to the storage vessel and containing the catalyst.

In a preferred embodiment, the reaction chamber is equipped with heating unit that is optionally electronically controllable. This heating unit can be used in order to optionally melt reaction material transported from the storage vessel to the reaction chamber and/or to accelerate the conversion reaction by an increased temperature.

It is preferred to provide the reaction chamber with a funnel-shaped return flow device discharging into the reaction chamber. In this manner, evaporated or transported diphosgene and/or triphosgene can be condensed in the reaction chamber and led back into the reaction system. In a preferred embodiment, the return flow device consists of a reflux condenser with heat exchanger mounted on the outside of the device or of pitched baffle plates. The baffle plates preferably consist of coated metal plates. The coating can consist of a suitable inert plastic such as polytetrafluoroethylene or perfluoroalkoxy polymer or glass for example. The baffle plates of metal possess a high thermal conductivity such that a thermal equilibrium can be easily set in the reaction chamber.

For reasons of simplicity for delivering the triphosgene into the reaction chamber, the storage vessel is arranged in a preferred embodiment for the up-take of triphosgene in tablet form. In this connection, the loading of the storage vessel can optionally be carried out by means of a tablet magazine, for example, in the form of a tubule of glass or plastic such as PTFE or PFA. In this manner, a simpler loading can be performed without the danger of contact with triphosgene.

Figure 2:
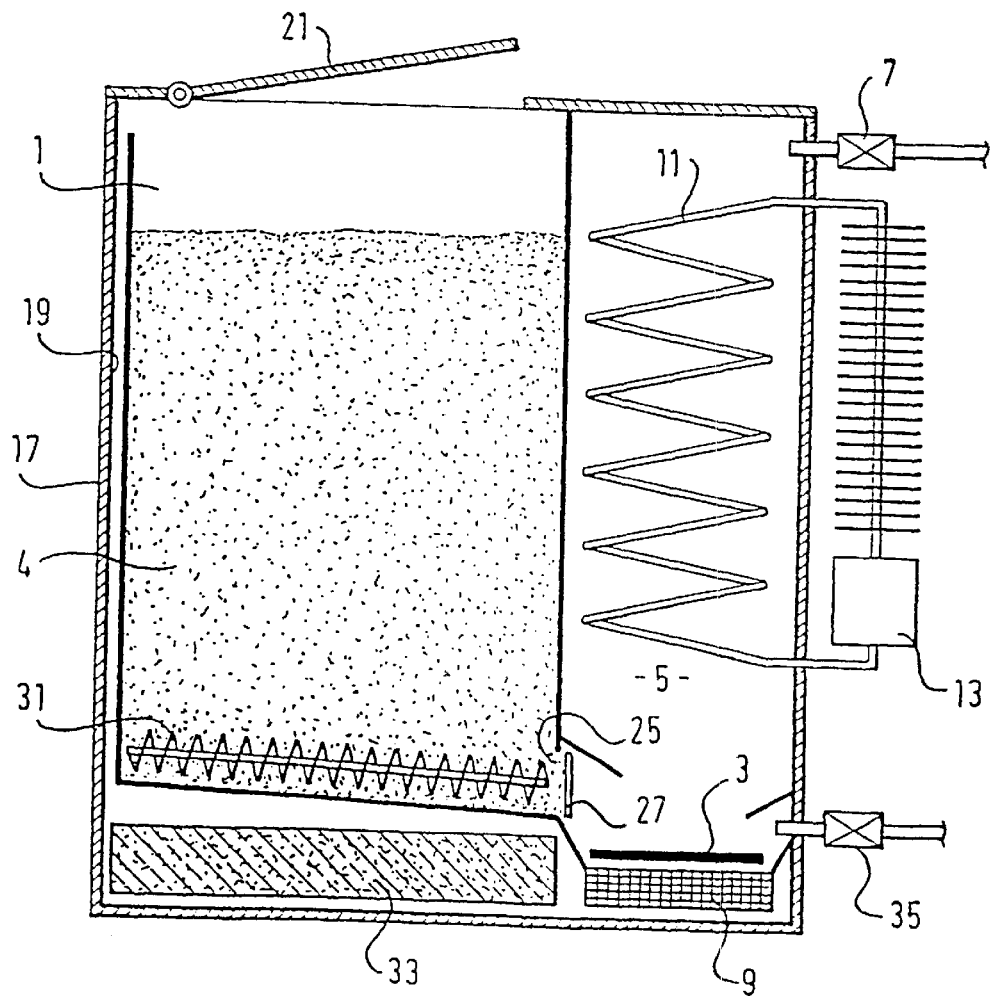

FIGS. 1 and 2 show preferred embodiments of the device according to the invention. The device consists of an encased housing (17) of suitable, inert plastic (for example, polytetrafluoroethylene (PTFE) or perfluoroalkoxy polymers (PFA)) or metal with plastic (PTFE, PFA) or glass insert or coating (19). The storage vessel (1) for diphosgene and/or triphosgene (4) comprises a closing cover capable of being fastened (21) or a locking screw (23) on the upper side and a dosage device with closable passage opening (25) to the reaction chamber (5) for the reaction material. The closure (27) of the passage opening (25) can be a flap, cover or a sliding shutter. As a result of the gas development during the reaction, a pressure lock can also be used as a passage opening that permits a higher pressure in the reaction chamber with respect to the storage vessel without phosgene entering the storage vessel with open passage opening, for example, in the transport of the reaction material from the storage vessel into the reaction chamber.

The dosage device can be a simple opening (29) (especially in the case of the use of triphosgene in tablet form (2)) or a motor-driven drive (31) such as a screw drive for example.

In order to avoid moisture in the storage vessel, a dehydration unit (33) with suitable drying substance (for example, silica gel) is mounted in the device in such a manner that it is in equilibrium with the gas volume found over the reaction material in the storage vessel (1).

The catalyst (3) is found in amorphous or crystalline form in the reaction chamber (5), is applied to the walls of the reaction chamber or is immobilized by a carrier.

The reaction chamber is equipped with a heating unit (9) for heating the reaction mixture. A safety valve (35), which is connected over a gas line with an exhaust, is mounted in the reaction chamber directly above the reaction mixture. The return flow device is configured in the form of baffle plates (15) or as a reflux condenser for the phosgene produced (11) with heat exchanger (13). A gas exhaust valve (7) is found at the top end of the reaction chamber (5). The reaction chamber can be cleaned after completion of the reaction with gas, for example inert gas or dry air, wherein the gas exchange can occur over the safety valve (35) and the gas exhaust valve (7).

Figure 3:
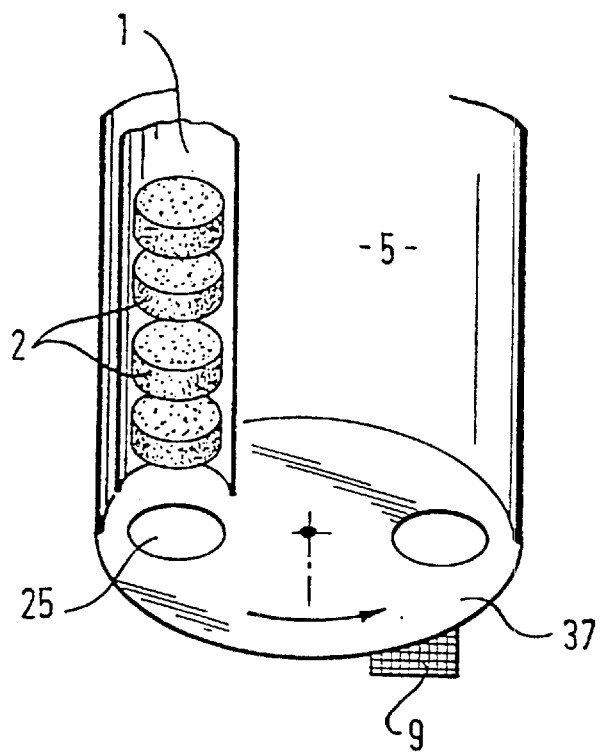
Figure 4:
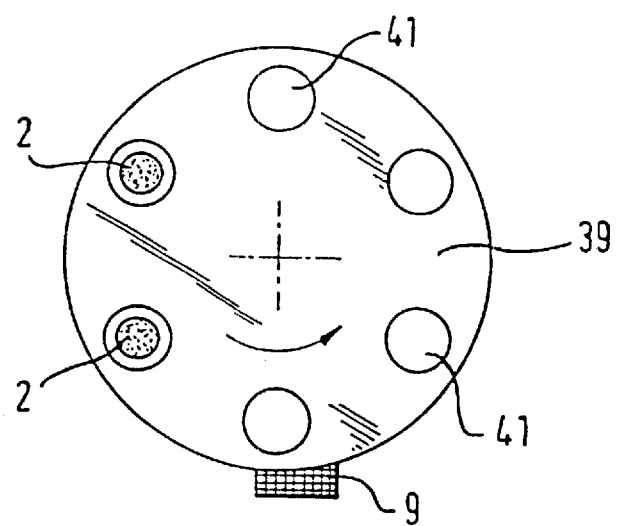

FIGS. 3 and 4 schematically show special embodiments of the dosage device with which the reaction material is transported into the reaction chamber. In FIG. 3, the delivery of the tablet-formed reaction material (2) from the storage vessel (1) into the reaction chamber (4) occurs according to the "revolver principle" with a rotatable disk (37) with at least one passage opening (25), preferably two or more openings, for the up-take of tablets. By turning of the disk (37), the tablets are transported into the reaction room (5) over the heating unit (9). In this connection, the disk (37) simultaneously functions as a pressure lock. In an embodiment schematically represented in FIG. 4 as a top view, a disk (39) with several openings (41) that are filled with the reaction material (2) in tablet form functions as a pre-formulated storage vessel for the transport of the tablets over the heating unit (9). The storage vessel can be configured in the form of a customary blister packaging for tablets for example.

Plastic, for example PTFE or PFA, or glass is the preferred material for the disks (37) and (39).

In order to control automatic production of phosgene, an electronic regulation device can be used that displays and regulates the delivery of reaction material from the storage vessel, the temperature in the reaction chamber, the return flow device from the reflux condenser and heat exchanger and the gas exhaust over a valve.

The following examples 1–21 more closely illustrate the invention.

The catalysts according to the invention used in the examples as well as the reaction conditions and results are summarized in Tables 1 to 3.

The reactions are carried out in a two-necked flask with reflux condenser that is connected with a cold trap ending in a drying tube. The reaction temperature is measured by a thermometer in the second neck of the reaction flask. Heating of the reaction flask occurs by an oil bath with a thermometer. In the measurements of the volumetric flow rate, the cold trap is replaced by a gas buret with ice water/ice as a sealing liquid.

Diphosgene and/or triphosgene is put into the reaction flask and heated at a bath temperature of 100° C. When the entire reaction material is melted (for triphosgene, at 80 to 85° C.), the catalyst is added all at once through the neck provided with the thermometer and the flask is sealed. After about 30 seconds to 1 minute, a uniform phosgene development arises which constantly runs further until the end of the reaction. The bath temperature is adjusted to the desired value and triphosgene sublimed during the reaction is fed back into the bottom by intermediately produced diphosgene (liquid) transported by the flow of phosgene. The reaction is ended when the catalyst remains dry. The phosgene condensed in the cold trap is weighed for determination of the yield.

If an experiment is repeated once or several times, the triphosgene is added into the reaction flask still provided with the used catalyst, this mixture is heated in the oil bath pre-heated to 100° C. and the process is continued as described above.

Table 1 shows the phosgene development from triphosgene on metal phthalocyanines as a function of the concentration of the catalyst and the bath and/or reaction temperature. In the case of the example Nr. 3, the renewed addition of 100 g triphosgene to the previously used catalyst led to the same results, which demonstrates that the catalyst is stable in the reaction over a longer time period. The following depicted immobilized polyacrylic acid-tetraethylene glycol-cobalt phthalocyanine (PAS-TEG-PcCO) also catalyses the conversion reaction of triphosgene even at small concentrations (see Ex. 6a): based on the example of the volumetric flow rate of the phosgene developed by the reaction of triphosgene on chloroaluminum phthalocyanine, Table 2 demonstrates the capability of the method according to the invention to be controlled by regulation of the reaction temperature and amount of catalyst.

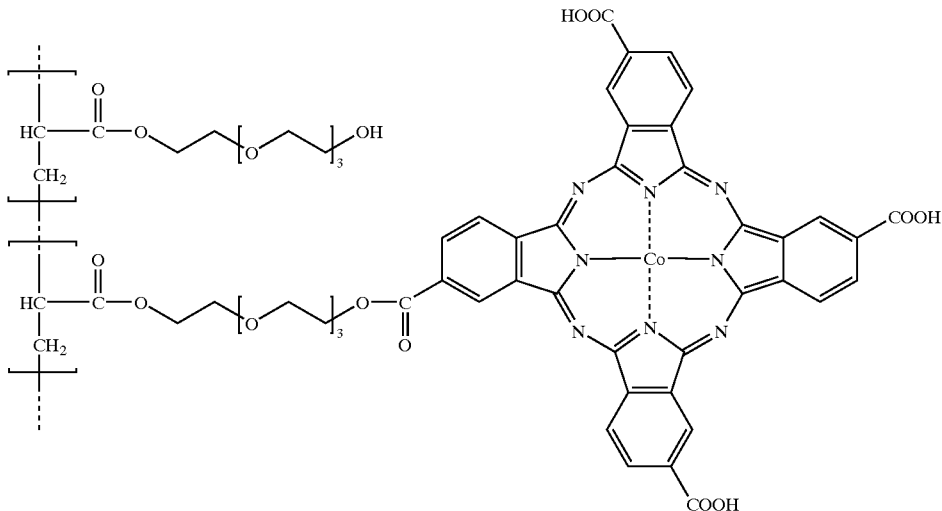

Table 3 shows the development from triphosgene on further catalysts with imine and amine functions as a function of the catalyst concentration. Nearly 100% yields of phosgene are obtained in these cases as well. A renewed double addition of 10 g of triphosgene to the catalyst in example Nr. 17 also leads to the same yield results which proves the stability of the catalyst. Immobilized catalysts are represented in Examples 15, 16, 16a as well as 20 and 21, wherein the examples 20 and 21 use a compound as a catalyst that contains an amine function with deactivated free electron pair.

The reaction of diphosgene to phosgene on chloroaluminum phthalocyanine (Ex. 19) already occurs at 50° C. and is about four-fold as fast as with the use of triphosgene as a starting material. Since diphosgene is created in the reaction of triphosgene to phosgene, it follows that the decomposition step of triphosgene to diphosgene is rate determining:

This also follows from the fact that triphosgene crystallizes out of the reaction mixture of triphosgene, diphosgene and catalyst with many of the catalysts according to the invention when removing the supply of energy (cooling), whereas diphosgene is further decomposed until a completely dry residue of triphosgene and catalyst remains that can be harmlessly stored.

The development of phosgene can be started again and continued by renewed heating of the reaction mixture of triphosgene and catalyst. This process can be repeated several times such that a safe and controllable phosgene generator is provided. The cycling stability of the catalysts was demonstrated by the above mentioned experiments 3 and 17 with used catalysts.

The catalyst activity can be especially preset in the metal phthalocyanines by the selection of the metal atom, whereas the more exact rate of reaction can occur over the temperature and optionally the catalyst concentration.

Aside from the mentioned advantages, especially the controllability of the reaction, further advantages of the method according to the invention are apparent from carrying out the examples: after addition of the catalyst into the melt of triphosgene, a latent period of 0.5 to 1 min. follows, during which no phosgene escapes and therefore no local excess pressure can arise. Therefore, the reaction vessel can be opened before the reaction without special sealing mechanisms, the catalyst can be added to the melt and the vessel can be closed again. Furthermore, the development of phosgene occurs over the entire duration of the reaction in a constant manner and a sudden change of the rate of formation of phosgene does not occur in the beginning or in the end phase.

The reaction also runs nearly stochiometrically at higher reaction temperatures and no side products arise. Additionally, the method can be carried out as a self-regulating reaction if the diphosgene precipitated at the cooling head (together with re-sublimated triphosgene) flows back into the reaction mixture and reduces its temperature. Thus, examples 3a, 7a and 16a provide the temperature profile of the reaction: up to a bath temperature of 135° C., the reaction temperature lies about 10° C. under this in all three reactions. At a bath temperature above this up to about 180° C., the reaction temperature in the faster reactions (Examples 3a and 16a) remains at about 125° C. as a result of the higher return of diphosgene; with the slow reaction (Example 7a), the reaction temperature takes on a constant value at 145° C.

Hence, the present invention provides a method in which phosgene can be produced from safe convenient substitute materials (precursors) in manner that can be regulated and controlled as well as a device for fast and simple production of phosgene from the mentioned substitute materials.

TABLE 1

| Ex. no. | catalyst | triphosgene amount [g] | catalyst conc. [mol %] | bath temp. [° C.] | reaction temp. [°°C.] | reaction time [min] | phosgene yield [%] |
| --- | --- | --- | --- | --- | --- | --- | --- |
| 1 | α-CuPc | 10 | 1 | 100 | 90 | 5 | 96 |
| 2 | α-CuPc | 10 | 0.2 | 115 | 105 | 25 | 98 |
| 3 | α-CuPc | 100 | 0.2 | 100 | 90 | 35 | 99–100 ([1]) |
| 3a | α-CuPc | 50 | 0.2 | 100–165 | 90–125 | — | 100 |
| 4 | β-CuPc | 10 | 2 | 115 | 105 | 1200 | 99 |
| 5 | FePc | 10 | 2 | 115 | 105 | 1200 | 99 |
| 5a | MoPc | 10 | 1 | 115 | 105 | 90 | 94 |
| 6 | CoPc | 10 | 2 | 100 | 90 | 15 | 99 |
| 6a | PAS-TEG-PcCo ([2]) | 10 | 0.1 | 115 | 105 | 14 | 100 |
| 7 | ClAlPc | 100 | 2 | 115 | 105 | 300 | 99 |
| 7a | ClAlPc | 50 | 2 | 105–175 | 95–145 | — | 96 |
| 8 | ClAlPc | 1000 | 2 | 115 | 105 | 300 | 99 |
| 8a | OVPc | 10 | 1 | 115 | 105 | 120 | 96 |

([1]) The renewed addition of 100 g of triphosgene leads to the same results
([2]) polyacrylic acid-tetraethylene glycol-cobalt phthalocyanine

TABLE 2

| Example no. | triphosgene amount [g] | catalyst conc. [mol %] | bath temp. [° C.] | volumetric flow rate phosgene [ml/min] |
| --- | --- | --- | --- | --- |
| 9 | 10 | 1 | 95 | 3.7 |
| 10 | 10 | 2 | 100 | 6.3 |
| 11 | 10 | 2 | 110 | 11.5 |
| 12 | 10 | 2 | 125 | 44.8 |
| 13 | 10 | 10 | 100 | 95.5 |

TABLE 3

| Ex. no. | catalyst | triphosgene amount [g] | catalyst conc. [mol %] | bath temp. [° C.] | reaction temp. [° C.] | reaction time [min] | phosgene yield [%] |
| --- | --- | --- | --- | --- | --- | --- | --- |
| 14 | $H_2Pc$ | 10 | 1 | 100 | 90 | 4 | 97 |
| 15 | poly-(2-vinylpyridine) | 10 | 1 | 100 | 90 | 5 | 96 |
| 16 | poly-(2-vinylpyridine) | 10 | 0.1 | 100 | 90 | 60 | 98 |
| 16a | poly-(2-vinylpyridine) | 50 | 0.1 | 100–130 130–155 | 90–125 125–125 | — | 99 |
| 17 | phenanthridine | 10 | 0.1 | 115 | 95 | 21 | 98–99[1] |
| 18 | phenanthridine | 100 | 0.1 | 115 | 95 | 30 | 100 |
| 19 | ClAlPc | 10 (diphosgene) | 2 | 80 | — | 90 | 96 |
| 20 | DMAMPS[2] | 10 | 1 | 110 | 100 | 6 | 100 |
| 21 | DMAMPS[2] | 10 | 0.1 | 115 | 105 | 25 | 100 |

[1]The double addition of 10 g of triphosgene leads to the same results
[2]N, N-dimethylaminomethylpolystyrene

What is claimed is:

1. Method for the production of phosgene from one or both selected from the group consisting of diphosgene and triphosgene, by reaction on a catalyst, wherein the catalyst comprises one or more compounds having one or more nitrogen atoms with deactivated free electron pair, wherein said free electron pair is deactivated by one or more selected from the group consisting of mesomerism, one or more electron attracting groups in the vicinity of said nitrogen atoms, and one or more space filling groups in the vicinity of said nitrogen atoms.

2. Method for the production of phosgene from one or both selected from the group consisting of diphosgene and triphosgene, by reaction on a catalyst, wherein the catalyst comprises one or more compounds having one or more nitrogen atoms with deactivated free electron pair, wherein said compound is selected from compounds having one or more deactivated amine functions.

3. Method for the production of phosgene from one or both selected from the group consisting of diphosgene and triphosgene, by reaction on a catalyst, wherein the catalyst comprises one or more compounds having one or more nitrogen atoms with deactivated free electron pair, wherein said compound having a nitrogen atom with deactivated free electron pair is immobilized by binding to polymers.

4. Method for the production of phosgene from one or both selected from the group consisting of diphosgene and triphosgene, by reaction on a catalyst, wherein the catalyst comprises one or more compounds having one or more nitrogen atoms with deactivated free electron pair, wherein said compound is selected from the group consisting of poly(2-vinylpyridine), phenanthridine, phthalocyanine, and metal phthalocyanines.

5. The method according to claim 4, wherein said phthalocyanine and metal phthalocyanine have one or more substituents on the benzo groups.

6. The method according to claim 5, wherein said substituents are selected independently from the group consisting of alkyl, cycloalkyl, aryl, halogen, nitro, amino, cyano, carboxy, carbalkoxy, carboxamido, phthalocyanine and condensed cyclic groups and condensed heterocyclic groups.

7. The method according to claim 6, wherein said condensed cyclic groups and said condensed heterocyclic groups are themselves substituted.

8. The method according to claim 2, wherein said compound having a deactivated amine function is a deactivated tertiary amine<A compound.

9. The method according to claim 1, 2, 3, or 4 wherein the catalyst concentration is 0.01–10 mol % with respect to the amount of diphosgene and triphosgene.

10. The method according to claim 9, wherein the catalyst concentration is 0.1–2 mol % with respect to the amount of diphosgene and triphosgene.

11. The method according to claim 1, 2, 3, or 4 wherein the diphosgene and triphosgene is in the liquid state.

12. The method according to claim 1, 2, 3, or 4 wherein the reaction temperature is 80 to 150° C.

13. Device for the production of phosgene from one or more selected from the group consisting of diphosgene and triphosgene, comprising: a storage vessel (1) for diphosgene and triphosgene and a reaction chamber (5) with a phosgene outlet (7), connected to the storage vessel (1) and containing the catalyst (3).

14. The device according to claim 13, wherein said reaction chamber (5) is equipped with a heating unit (13).

15. The device according to claim 14, wherein said heating unit (13) is capable of being regulated electronically.

16. The device according to claim 13, wherein said reaction chamber (5) is equipped with a return flow device discharging into the reaction chamber.

17. The device according to claim 16, wherein said return flow device is selected from the group consisting of a reflux condenser (11) with heat exchange mounted on the outside of the device, and pitched baffle plates (15).

18. The device according to claim 17, wherein said baffle plates (15) consist of coated metal.

19. The device according to one of claim 13, wherein said storage vessel (1) is configured for up-take of triphosgene in tablet form.

20. The method according to claim 2 wherein the catalyst concentration is 0.01–10 mol % with respect to the amount of diphosgene and triphosgene.

21. The method according to claim 3 wherein the catalyst concentration is 0.01–10 mol % with respect to the amount of diphosgene and triphosgene.

22. The method according to claim 4 wherein the catalyst concentration is 0.01–10 mol % with respect to the amount of diphosgene and triphosgene.

23. The method according to claim 2 wherein the diphosgene and triphosgene is in the liquid state.

24. The method according to claim 3 wherein the diphosgene and triphosgene is in the liquid state.

25. The method according to claim 4 wherein the diphosgene and triphosgene is in the liquid state.

26. The method according to claim 2 wherein the reaction temperature is 80 to 150° C.

27. The method according to claim 3 wherein the reaction temperature is 80 to 150° C.

28. The method according to claim 4 wherein the reaction temperature is 80 to 150° C.

* * * * *